United States Patent
Fu (10) Patent No.: US 12,471,244 B2
(45) Date of Patent: Nov. 11, 2025

(54) MODE ADJUSTMENT METHOD FOR DRONE BASE STATION, ADJUSTMENT APPARATUS, AND DRONE BASE STATION

(71) Applicant: AUTEL ROBOTICS CO., LTD., Shenzhen (CN)

(72) Inventor: Dianlin Fu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/431,421

(22) Filed: Feb. 2, 2024

(65) Prior Publication Data

US 2024/0268067 A1    Aug. 8, 2024

(30) Foreign Application Priority Data

Feb. 3, 2023    (CN) .......................... 202310149239.4

(51) Int. Cl.
*H05K 7/20*    (2006.01)
*B64F 1/36*    (2024.01)

(52) U.S. Cl.
CPC ......... *H05K 7/20209* (2013.01); *B64F 1/362* (2013.01); *H05K 7/20145* (2013.01)

(58) Field of Classification Search
CPC ............ B60H 1/00257; B60H 1/00278; B60H 1/00478; B60L 53/00; B64F 1/35;
(Continued)

(56) References Cited

U.S. PATENT DOCUMENTS

| 10,526,094 B2 * | 1/2020 | Cheng .................... B64U 80/70 |
| 11,634,221 B2 * | 4/2023 | Chen ....................... F24H 15/25 |
| | | 244/110 E |

(Continued)

FOREIGN PATENT DOCUMENTS

| CN | 108513685 A | 9/2018 |
| CN | 109764443 A | 5/2019 |

(Continued)

OTHER PUBLICATIONS

First Chinese office action dated Dec. 31, 2024; Appln. No. 202310149239.4 with English Translation.

*Primary Examiner* — Joshua E Rodden (57) ABSTRACT

This disclosure discloses a mode adjustment method for a drone base station. The mode adjustment method includes: acquiring a current temperature of an upper compartment; determining whether the current temperature is equal to or higher than a preset high temperature; when the current temperature is equal to or higher than the preset high temperature, controlling a temperature adjustment component to execute a refrigeration and heat dissipation mode; when the current temperature is lower than the preset high temperature, determining whether the current temperature is lower than or equal to a preset low temperature; when the current temperature is lower than or equal to the preset low temperature, controlling the temperature adjustment component to execute a heating and temperature maintaining mode; and when the current temperature is higher than the preset low temperature, controlling the temperature adjustment component to execute a standard operating mode.

12 Claims, 5 Drawing Sheets

(58) Field of Classification Search
CPC ......... B64F 1/352; B64U 70/90; B64U 70/92;
B64U 70/93; B64U 70/95; B64U 70/97;
B64U 70/99; B64U 80/10; H01M 10/443;
H01M 10/613; H01M 10/617; H01M
10/625; H01M 10/653; H01M 10/6551;
H01M 10/6556; H02J 7/0042; H02J
7/0044; H02J 7/0045; H02J 7/34; H02J
7/342; H02J 7/345; H02J 7/35; H02J
7/20; H02J 7/20136; H02J 7/20145; H02J
7/20172; H02J 7/2089; H02J 7/209; H02J
7/20909; H02J 7/20918; H02J 7/20927;
H02J 7/20936; H02J 7/20945; Y02T
10/70
USPC ........................................................ 244/114 R
See application file for complete search history.

(56) References Cited

U.S. PATENT DOCUMENTS

| | | | |
|---|---|---|---|
| 11,912,408 B2* | 2/2024 | Falk-Petersen | B64U 80/10 |
| 12,030,403 B2* | 7/2024 | Henry | B64F 1/12 |
| 12,162,635 B2* | 12/2024 | Lowe | H01M 10/6572 |
| 12,172,778 B2* | 12/2024 | Lowe | B64U 70/95 |
| 2018/0327091 A1* | 11/2018 | Burks | B64U 50/13 |
| 2019/0383052 A1* | 12/2019 | Blake | E04H 6/12 |
| 2020/0001735 A1* | 1/2020 | Cheng | G08G 5/0091 |
| 2021/0031947 A1* | 2/2021 | Wankewycz | B60L 53/51 |
| 2021/0047055 A1* | 2/2021 | Lee | B64F 1/36 |
| 2021/0107682 A1* | 4/2021 | Kozlenko | B64U 70/30 |
| 2021/0269174 A1* | 9/2021 | Shuff | G08G 5/025 |
| 2021/0276735 A1* | 9/2021 | Raptopoulos | G08G 5/0026 |
| 2022/0396373 A1* | 12/2022 | Wang | G05D 1/101 |
| 2024/0132238 A1* | 4/2024 | Qiu | B64U 70/92 |
| 2024/0190593 A1* | 6/2024 | Shah | B60L 53/14 |
| 2024/0239533 A1* | 7/2024 | Li | B64U 70/99 |
| 2024/0268067 A1* | 8/2024 | Fu | B64F 1/362 |

FOREIGN PATENT DOCUMENTS

| | | |
|---|---|---|
| CN | 214382006 U | 10/2021 |
| CN | 215753079 U | 2/2022 |

\* cited by examiner

MODE ADJUSTMENT METHOD FOR DRONE BASE STATION, ADJUSTMENT APPARATUS, AND DRONE BASE STATION

CROSS REFERENCE TO RELATED DISCLOSURE

This patent claims priority to Chinese Patent application No. 202310149239.4, filed Feb. 3, 2023, the entirety of which is hereby incorporated herein by reference.

TECHNICAL FIELD

Embodiments of this disclosure relate to the technical field of drones, in particular, to a mode adjustment method for a drone base station, an adjustment apparatus, and a drone base station.

BACKGROUND

In the technical field of drones, base stations are typically configured to provide services such as parking and charging for the drones. However, the base stations are generally arranged outdoors. Therefore, an ambient temperature has a significant influence on the base stations. When a battery of a drone is at a temperature within a range of 10° C. to 30° C., high charging efficiency is achieved, and when the battery is at a temperature lower than 0° C. or higher than 45° C., battery charging efficiency of the drone sharply decreases or the battery even cannot be charged.

During implementation of the embodiments of this disclosure, the inventors have found that: currently, in consideration of costs, drone base stations mounted in highly hot regions have only a heat dissipation function, and drone base stations mounted in cold regions have only a temperature maintaining function. However, when an ambient temperature of one region changes significantly, existing base stations cannot guarantee a high-efficiency charging service for drones.

SUMMARY

A technical problem to be solved mainly by the embodiments of this disclosure is to provide a mode adjustment method for a drone base station, an adjustment apparatus and a drone base station for implementing real-time adjustment of different operating modes of the base station according to different ambient temperatures, so as to ensure that the base station can continuously provide a high-efficiency charging service for drones.

According to a first aspect of the present disclosure, some embodiments provide a mode adjustment method for a drone base station. The drone base station comprises a bracket, a parking apron and a temperature adjustment component. The bracket is provided with an accommodating chamber. The parking apron divides the accommodating chamber into an upper compartment and a lower compartment, where the upper compartment is configured for parking a drone. The temperature adjustment component is arranged in the lower compartment, and the temperature adjustment component has a refrigeration and heat dissipation mode, a heating and temperature maintaining mode and a standard operating mode. The mode adjustment method includes: acquiring a current temperature of the upper compartment; determining whether the current temperature is equal to or higher than a preset high temperature; when the current temperature is equal to or higher than the preset high temperature, controlling the temperature adjustment component to execute the refrigeration and heat dissipation mode; when the current temperature is lower than the preset high temperature, determining whether the current temperature is lower than or equal to a preset low temperature; when the current temperature is lower than or equal to the preset low temperature, controlling the temperature adjustment component to execute the heating and temperature maintaining mode; and when the current temperature is higher than the preset low temperature, controlling the temperature adjustment component to execute the standard operating mode.

The second aspect of this disclosure is to provide an adjustment apparatus. The adjustment apparatus includes: a first acquiring component configured to acquire a current temperature of the upper compartment; a first determining component configured to determine whether the current temperature is equal to or higher than a preset high temperature; a first control component configured to control the temperature adjustment component to execute a refrigeration and heat dissipation mode if the current temperature is equal to or higher than the preset high temperature; a second determining component configured to determine whether the current temperature is lower than or equal to a preset low temperature if the current temperature is lower than the preset high temperature; a second control component configured to control the temperature adjustment component to execute a heating and temperature maintaining mode if the current temperature is lower than or equal to the preset low temperature; and a third control component configured to control the temperature adjustment component to execute a standard operating mode if the current temperature is higher than the preset low temperature.

The third aspect disclosure of this disclosure is to provide a drone base station. The drone base station includes a bracket, a parking apron, a temperature adjustment component, a controller and a drone monitor. The bracket is provided with an accommodating chamber. The parking apron divides the accommodating chamber into an upper compartment and a lower compartment, where the upper compartment is configured for parking a drone. The temperature adjustment component is arranged in the lower compartment, and the temperature adjustment component has a refrigeration and heat dissipation mode, a heating and temperature maintaining mode and a standard operating mode. The standby battery is electrically connected to the temperature adjustment component. The controller is in electrical connection and signal connection with the temperature adjustment component, the standby battery and the drone monitor separately.

The temperature adjustment component includes a semiconductor module, an adapter, the standby battery, a first ventilation assembly, a second ventilation assembly and a third ventilation assembly. The first ventilation assembly includes a first fan and a first air duct, the second ventilation assembly includes a second fan and a second air duct, and the third ventilation assembly includes a third fan and a third air duct.

An upper end of the semiconductor module is located in the first air duct, a lower end of the semiconductor module is located in the second air duct. The first air duct is in communication with the upper compartment, the second air duct is in communication with the outside, and the third air duct is in communication with the lower compartment. The first fan, the second fan and the third fan are all configured to provide power for air flowing.

The controller includes at least one processor, and a memory communicatively connected to the at least one processor, where instructions executable by the at least one processor are stored in the memory, and when the instructions are executed by the at least one processor, the at least one processor is caused to perform the mode adjustment method as described above.

The fourth aspect of this disclosure is to provide a non-transitory computer-readable storage medium, where computer-executable instructions are stored in the non-transitory computer-readable storage medium, and the computer-executable instructions are used for making a server perform the method as described above.

BRIEF DESCRIPTION OF THE DRAWINGS

To describe the technical solutions in specific embodiments of this disclosure or in the prior art more clearly, the following briefly describes the accompanying drawings required for describing the specific embodiments or the prior art. In all the accompanying drawings, similar elements or portions are generally marked by similar reference numerals. In the accompanying drawings, the elements or portions are not necessarily drawn to scale.

DETAILED DESCRIPTION

For ease of understanding this disclosure, the following makes a more detailed description of this disclosure with reference to the accompanying drawings and specific embodiments. It should be noted that when an element is referred to as "being fixed to" another element, it may be directly on the other element, or there may be one or more in-between elements. When an element is deemed as "being connected to" another element, it may be directly connected to the other element, or there may be one or more in-between elements. In the specification, the orientations or positional relationships indicated by the used terms "upper", "lower", "inside", "outside", "perpendicular", "horizontal", and the like are based on the orientations or positional relationships shown in the accompanying drawings. Such terms are intended merely for the ease and brevity of description of this disclosure without indicating or implying that the apparatuses or elements mentioned in this disclosure must have specified orientations or must be constructed and operated in the specified orientations, and therefore shall not be construed as any limitations on this disclosure. In addition, the terms including "first" and "second" are merely used for a purpose of description, and shall not be understood as indicating or implicating relative importance.

Unless otherwise defined, all technical and scientific terms used in the specification shall have the same meanings as usually understood by persons skilled in the art to which this disclosure belongs. The terms used in the specification of this disclosure are merely intended to describe specific embodiments but not to constitute any limitation on this disclosure. A term "and/or" used in the specification includes any and all combinations of one or more associated items that are listed.

In addition, technical features involved in different embodiments of this disclosure that are described below may be combined as long as they do not conflict with each other.

Figure 1:
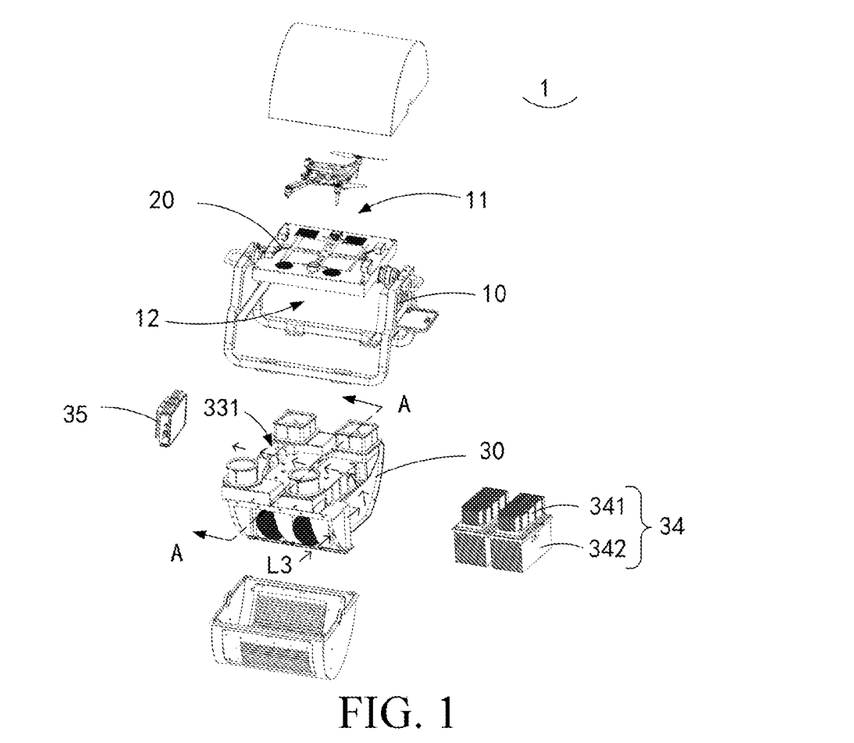
FIG. 1 is a first schematic diagram of an disclosure environment of a mode adjustment method for a drone base station according to an embodiment of this disclosure.
Figure 2:
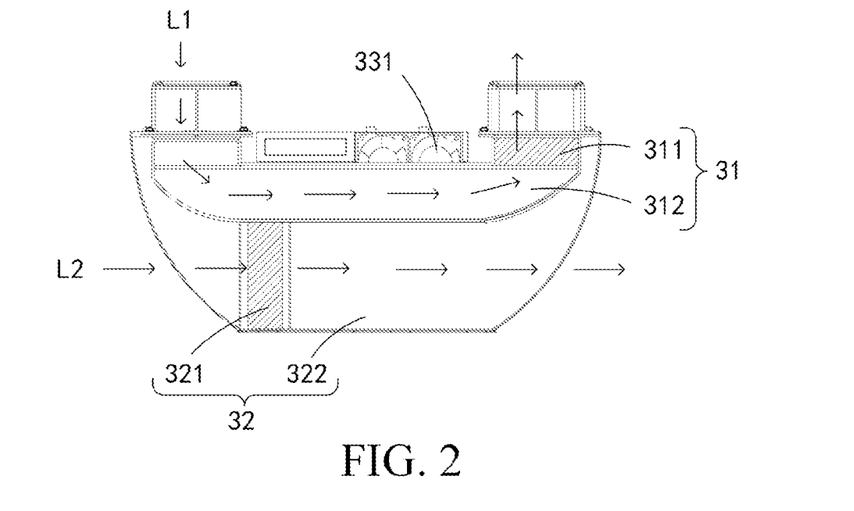
FIG. 2 is a second schematic diagram of an disclosure environment of a mode adjustment method for a drone base station according to an embodiment of this disclosure.

Refer to FIG. 1 and FIG. 2. FIG. 1 and FIG. 2 are two schematic diagrams of an disclosure environment of a mode adjustment method for a drone base station according to an embodiment of this disclosure. The disclosure environment includes a drone base station 1. The drone base station 1 includes a bracket 10, a parking apron 20, a charging mechanism, a temperature adjustment component 30 and a controller 50. The bracket 10 is provided with an accommodating chamber. The parking apron 20 divides the accommodating chamber into an upper compartment 11 and a lower compartment 12. The upper compartment 11 is configured for parking a drone. The charging mechanism is configured to provide a charging service for a drone. The temperature adjustment component 30 is arranged in the lower compartment 12. The temperature adjustment component 30 has a refrigeration and heat dissipation mode, a heating and temperature maintaining mode, and a standard operating mode. The controller 50 is in electrical connection and signal connection with the temperature adjustment component 30 and a drone monitor separately.

The temperature adjustment component 30 includes a temperature detector, a semiconductor module 34, an adapter, a standby battery 35, a first ventilation assembly 31, a second ventilation assembly 32 and a third ventilation assembly. The temperature detector is arranged in the upper compartment 11, is in electrical signal connection with the controller 50, and is configured to continuously detect a temperature of the upper compartment 11. The adapter is in electrical signal connection with the semiconductor module 34 and the controller 50 separately, and the controller 50 sends a signal to the adapter so as to control the adapter to provide power for the semiconductor module 34. The standby battery 35 is electrically connected to the adapter and the semiconductor module 34 separately. The first ventilation assembly 31 includes a first fan 311 and a first air duct 312, the second ventilation assembly 32 includes a second fan 321 and a second air duct 322, and the third ventilation assembly includes a third fan 331 and a third air duct. A track L1 formed by arrows in FIG. 2 shows a schematic diagram of air flowing in the first air duct 312. A track L2 formed by arrows shows a schematic diagram of air flowing in the second air duct 322. A track L3 formed by arrows in FIG. 1 shows a schematic diagram of air flowing in the third air duct.

An upper end 341 of the semiconductor module 34 is located in the first air duct 312, and a lower end 342 of the semiconductor module 34 is located in the second air duct 322. The first air duct 312 is in communication with the upper compartment 11, the second air duct 322 is in communication with the outside, and the third air duct is in communication with the lower compartment 12. The first fan 311, the second fan 321, and the third fan 331 are all configured to provide power for air flowing.

The controller includes at least one processor, and a memory communicatively connected to the at least one processor, where instructions executable by the at least one processor are stored in the memory, and when the instructions are executed by the at least one processor, the at least one processor is caused to perform the mode adjustment method for a drone base station according to the embodiment of this disclosure.

Figure 3:
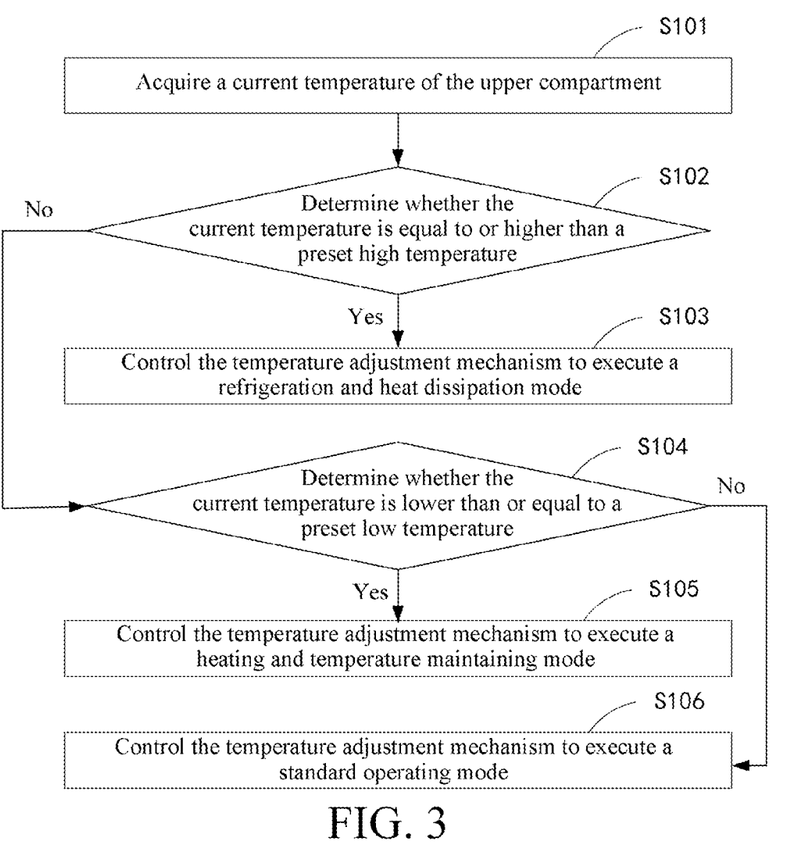
FIG. 3 is a flowchart of a mode adjustment method for a drone base station according to an embodiment of this disclosure.

FIG. 3 is a flowchart of a mode adjustment method for a drone base station according to this disclosure. As shown in FIG. 3, the mode adjustment method includes the following steps.

Step S101. Acquire a current temperature of the upper compartment.

When the drone base station is in an operating state, the temperature detector arranged in the upper compartment continuously detects the current temperature of the upper compartment and sends electrical signal information of the current temperature to the controller, so that the controller can execute a preset control program.

It is worth noting that when the drone base station is in an operating state, the accommodating chamber of the bracket is in a closed state, and the temperature detector detects a temperature of the upper compartment in a closing process.

Step S102. Determine whether the current temperature is equal to or higher than a preset high temperature.

After receiving the current temperature information of the upper compartment sent by the temperature detector, the controller compares the current temperature with the preset high temperature. It is worth noting that the preset high temperature is a temperature value preset manually, and the temperature in the upper compartment can be determined as a high temperature according to an actual condition. For example, it can be determined that the upper compartment is at a high temperature when the temperature is equal to or higher than 30° C.

Step S103. If the current temperature is equal to or higher than the preset high temperature, control the temperature adjustment component to execute the refrigeration and heat dissipation mode.

When the current temperature of the upper compartment is equal to or higher than the preset high temperature, it indicates that the upper compartment is not a desirable charging environment for charging a drone. Therefore, the controller needs to control the temperature adjustment component to switch to the refrigeration and heat dissipation mode, such that the temperature of the upper compartment is reduced.

Figure 4:
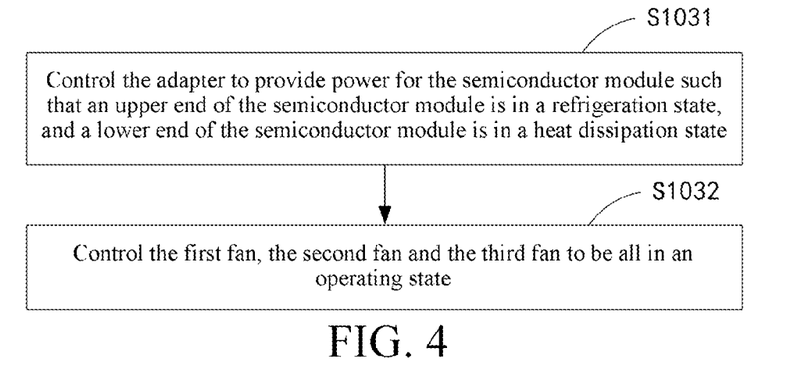
FIG. 4 is a flowchart of step S103 in a mode adjustment method for a drone base station according to an embodiment of this disclosure.

In some embodiments, referring to FIG. 4, step S103 includes the following steps.

Step S1031. Control the adapter to provide power for the semiconductor module such that the upper end of the semiconductor module is in a refrigeration state, and the lower end of the semiconductor module is in a heat dissipation state.

The semiconductor module includes the upper end and the lower end. Currents in different directions are inputted into the semiconductor module such that the upper end and lower end of the semiconductor module can be switched between a refrigeration operating state and a heat dissipation operating state. For example, when a first direct current is inputted into the semiconductor module, the upper end of the semiconductor module is in a refrigeration state and the lower end of the semiconductor module is in a heat dissipation state. When a second direct current having a direction opposite to a direction of the first direct current is inputted into the semiconductor module, the upper end of the semiconductor module is in a heat dissipation state and the lower end of the semiconductor module is in a refrigeration state.

Step S1032. Control the first fan, the second fan and the third fan to be all in an operating state.

When the controller controls the adapter to provide power for the semiconductor module, the upper end of the semiconductor module is in a refrigeration state and the lower end of the semiconductor module is in a heat dissipation state. The upper end of the semiconductor module is located in the first air duct, and the lower end of a semiconductor is located in the second air duct. Therefore, the controller needs to control the first fan to operate, such that cold air flow in the first air duct blows into the upper compartment to achieve an effect of reducing the current temperature of the upper compartment.

The controller controls the second fan to operate, such that hot air in the second air duct can be discharged to the outside in time, so as to prevent a temperature rise of the overall drone base station caused by accumulation of hot air in the second air duct.

The controller controls the third fan to operate, such that elements and components such as the adapter, the controller and the drone monitor in the third air duct are ventilated and cooled, and thus the elements and components can operate in an environment with good ventilation, thereby reducing power consumption of the elements and components.

Figure 5:
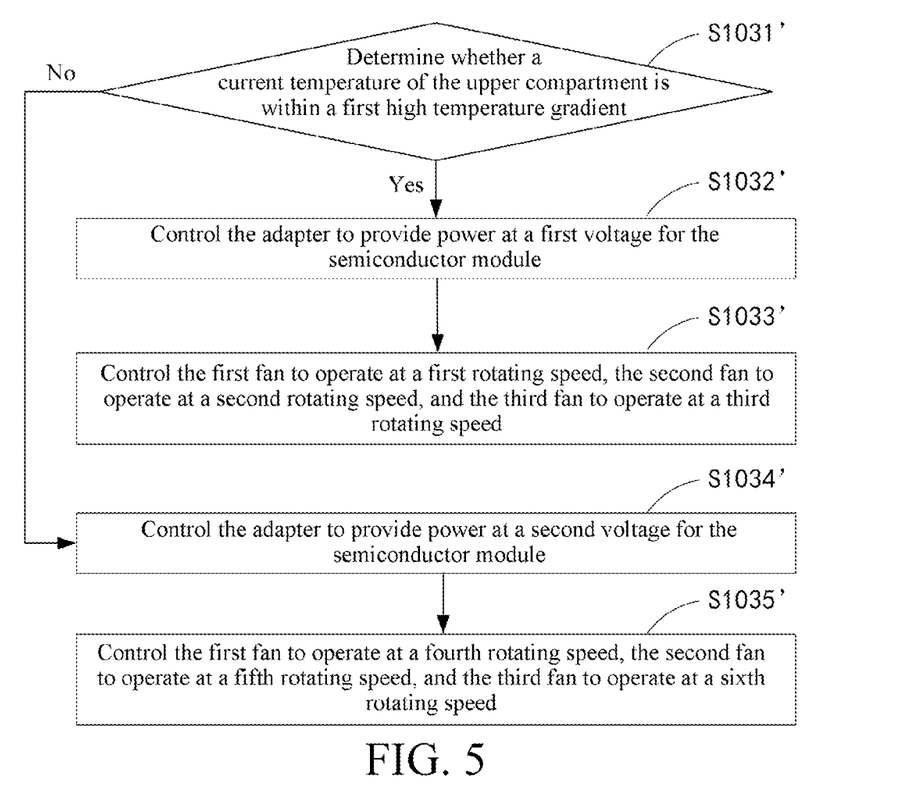
FIG. 5 is a flowchart of step S103 in a mode adjustment method for a drone base station according to another embodiment of this disclosure.

In some other embodiments, referring to FIG. 5, step S103 includes the following steps.

Step S1031'. Determine whether the current temperature of the upper compartment is within a first high temperature gradient.

When it is determined that the current temperature of the upper compartment is a high temperature, to further precisely determine the current temperature of the upper compartment, the preset high temperature may be manually divided into two high temperature gradients. For example, a temperature from 30° C. to 40° C. in the upper compartment is considered as the first high temperature gradient, and a temperature higher than 40° C. in the upper compartment is preset as a second high temperature gradient. Within different high temperature gradients, the elements and components can each operate with different operating parameters, thereby further improving an energy conservation effect of the drone base station.

It can be understood that in other embodiments, three, four or more high temperature gradients may be set. If the high temperature is divided into more gradients, in each high temperature gradient, the elements and components can each operate corresponding to one group of preset operating parameters, and thus the drone base station has a more significant energy conservation effect.

Step S1032'. If the current temperature is within the first high temperature gradient, control the adapter to provide power at a first voltage for the semiconductor module.

When the current temperature of the upper compartment is within different high temperature gradients, the controller can control the adapter to provide power at different voltages for the semiconductor module. For example, when the upper compartment is at a higher temperature, the adapter provides power at a higher voltage for the semiconductor module, such that the upper end of the semiconductor module achieves a better refrigeration effect, and thus the upper compartment can be cooled within a shorter time.

It can be understood that the controller can further control the adapter to provide power at different currents for the semiconductor module.

Step S1033'. Control the first fan to operate at a first rotating speed, the second fan to operate at a second rotating speed, and the third fan to operate at a third rotating speed.

When the current temperature of the upper compartment is within different high temperature gradients, the controller can control the first fan to operate at different rotating speeds. For example, when the upper compartment is at a higher temperature, the first fan has a higher rotating speed. Similarly, the second fan and the third fan are also like this. The controller controls the first fan, the second fan and the third fan to correspond to different high temperature gradients at different rotating speeds, thereby effectively reducing operating load of each fan and improving the energy conservation effect of the drone base station.

It can be understood that the first rotating speed, the second rotating speed and the third rotating speed above may be the same or different.

Step S1034'. If the current temperature is not within the first high temperature gradient, control the adapter to provide power at a second voltage for the semiconductor module.

It is worth noting that the second voltage is higher than the first voltage.

Step S1035'. Control the first fan to operate at a fourth rotating speed, the second fan to operate at a fifth rotating speed, and the third fan to operate at a sixth rotating speed.

It is worth noting that the fourth rotating speed is higher than the first rotating speed, the fifth rotating speed is higher than the second rotating speed, and the sixth rotating speed is higher than the third rotating speed.

It can be understood that the fourth rotating speed, the fifth rotating speed and the sixth rotating speed above may be the same or different.

Step S104. If the current temperature is lower than the preset high temperature, determine whether the current temperature is lower than or equal to a preset low temperature.

When the current temperature of the upper compartment is lower than the preset high temperature, it indicates that the current temperature of the upper compartment may be a room temperature or a low temperature. Therefore, it is necessary to compare the current temperature with the preset low temperature and determine whether the upper compartment is at a low temperature.

It is worth noting that the preset low temperature is a temperature value preset manually, and the temperature in the upper compartment can be determined as a low temperature according to an actual condition. For example, it can be determined that the upper compartment is at a low temperature when the temperature is lower than or equal to 0° C.

Step S105. If the current temperature is lower than or equal to the preset low temperature, control the temperature adjustment component to execute the heating and temperature maintaining mode.

When the current temperature of the upper compartment is lower than or equal to the preset low temperature, it indicates that the upper compartment is at a low temperature, no matter whether the upper compartment is at a high temperature or a low temperature, it is not helpful for the drone base station to provide a charging service for a drone parked on the parking apron. Therefore, when the upper compartment is at a low temperature, the temperature of the upper compartment needs to be increased.

Figure 6:
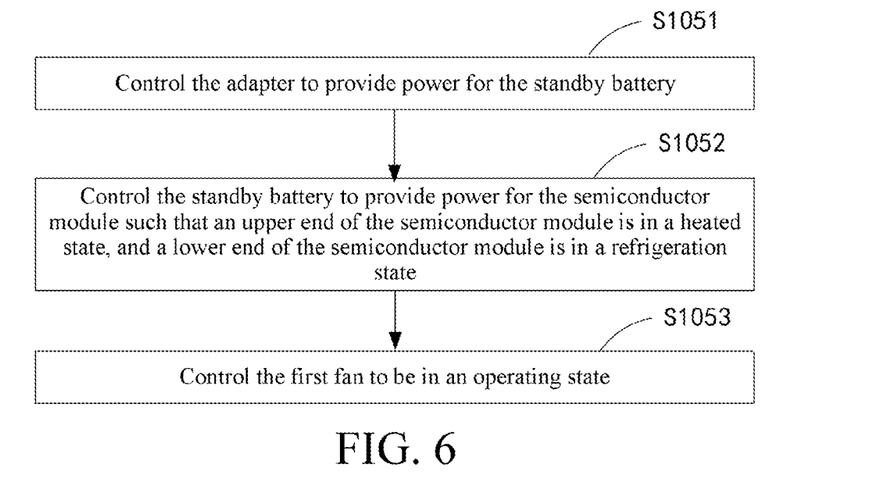
FIG. 6 is a flowchart of step S105 in a mode adjustment method for a drone base station according to an embodiment of this disclosure.

In some embodiments, referring to FIG. 6, step S105 includes the following steps.

Step S1051. Control the adapter to provide power for the standby battery.

Step S1052. Control the standby battery to provide power for the semiconductor module such that the upper end of the semiconductor module is in a heated state, and the lower end of the semiconductor module is in a refrigeration state.

With the standby battery provided additionally, the controller first controls the adapter to provide power for the standby battery and then uses the standby battery to provide power for the semiconductor module. It can be understood that a current direction of power directly provided by the adapter for the semiconductor module is opposite to a current direction of power indirectly provided by the standby battery for the semiconductor module. Therefore, the upper end and lower end of the semiconductor module are also in opposite operating states, that is, when the adapter indirectly provides power for the semiconductor module through the standby battery, the upper end of the semiconductor module is in a heated state, and the lower end of the semiconductor module is in a refrigeration state.

Step S1053. Control the first fan to be in an operating state.

When the standby battery provides power for the semiconductor module, air in the first air duct is heated. Therefore, the controller needs to control the first fan to be in an operating state, such that hot air in the first air duct blows into the upper compartment, and thus the temperature of the upper compartment rises to a certain extent.

It can be understood that when the current temperature of the upper compartment is relatively low, an external ambient temperature is also relatively low. In other words, the overall drone base station is in a low-temperature environment, and the lower end of the semiconductor module as well as the elements and components such as the controller, the adapter and the standby battery can all exchange heat with the outside. Therefore, the controller may be set according to an actual situation to control the second fan and the third fan to be in an operating state or not to be in an operating state.

It can be understood that just as the preset high temperature being set as different high temperature gradients, the preset low temperature may also be set as at least two different low temperature gradient groups. Each low temperature gradient group corresponds to one group of operating parameters, such that the semiconductor module, the first fan, the second fan, the third fan and the like can operate in a better state.

Step S106. If the current temperature is higher than the preset low temperature, control the temperature adjustment component to execute the standard operating mode.

When the current temperature of the upper compartment is neither a high temperature nor a low temperature, it indicates that the current temperature of the upper compartment is a room temperature, that is, a temperature environment of the upper compartment is within a temperature range that is appropriate for charging a drone. Therefore, the controller controls the temperature adjustment component to be in the standard operating mode.

In some embodiments, step S106 includes the following step.

Control the first fan and the third fan to be in an operating state.

When the temperature adjustment component is in the standard operating mode, the semiconductor module is in a non-operating state. Therefore, the second fan may be a non-operating state, and the controller controls the first fan to operate so as to realize air flow circulation in the upper compartment, such that a charging environment of a drone is within a desirable temperature range. Some heat is produced during operating of the elements and components such as the controller and the charging mechanism in the third air duct. Therefore, the controller needs to control the third fan to operate so as to discharge the heat in the third air duct to the outside in time.

Figure 7:
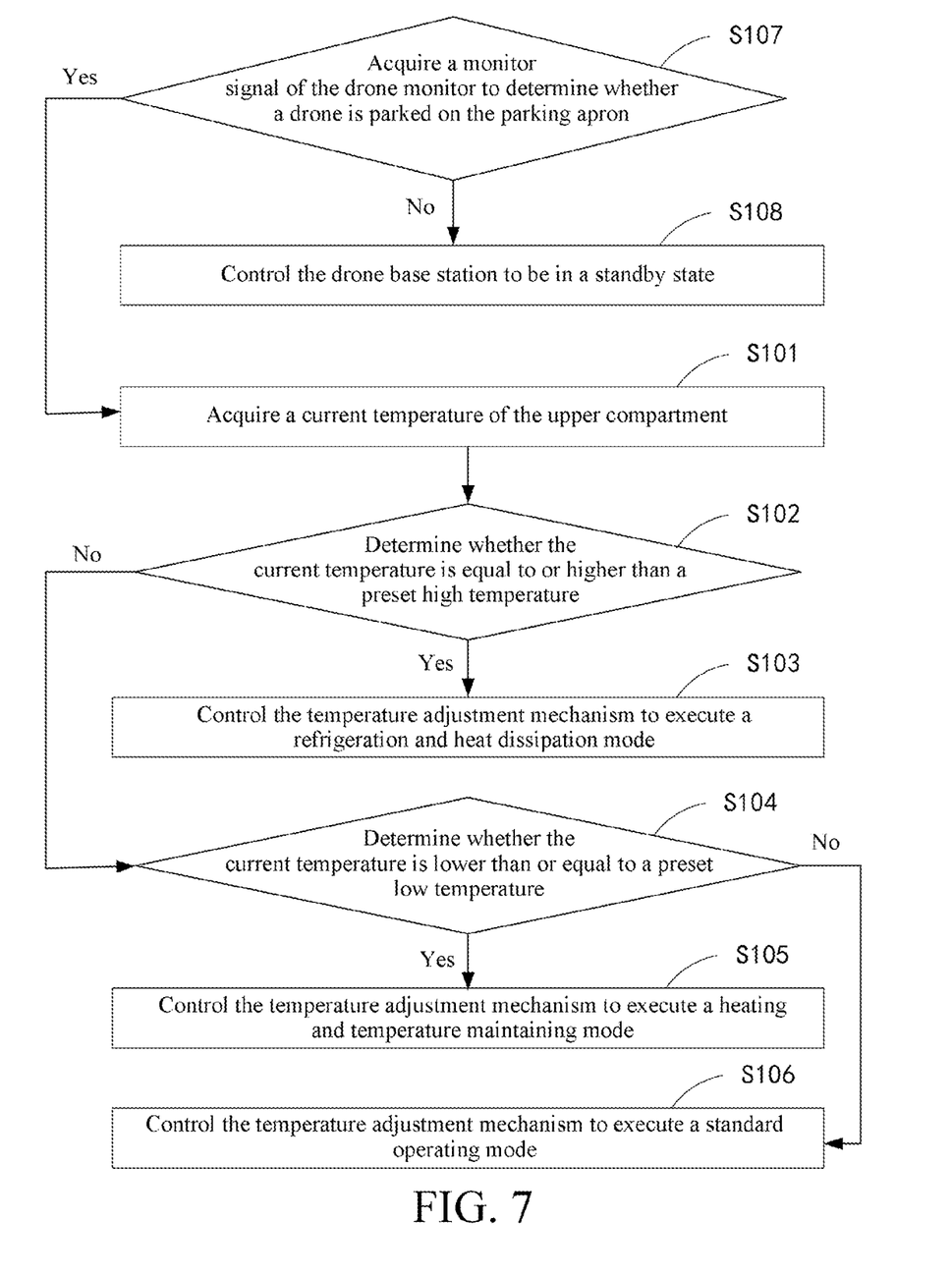
FIG. 7 is a flowchart of a mode adjustment method for a drone base station according to another embodiment of this disclosure.

This disclosure further provides another embodiment. Referring to FIG. 7, differing from the above embodiments, a drone base station in this embodiment includes a drone monitor. The drone monitor is in electrical signal connection with the controller and is configured to monitor whether a drone is parked on the parking apron and send a monitor signal to the controller. The controller controls an operating state of the drone base station according to the monitor signal. A mode adjustment method for a drone base station further includes the following steps.

Step 107. Acquire a monitor signal of the drone monitor to determine whether a drone is parked on the parking apron; and when a drone is parked on the parking apron, perform the step 101 of acquiring a current temperature of the upper compartment.

Step 108. If no drone is parked on the parking apron, control the drone base station to be in a standby state.

With the drone monitor provided, when no drone is parked on the parking apron, the temperature detector in the upper compartment does not need to detect the temperature continuously, reducing energy consumption of the temperature detector.

Alternatively, the temperature adjustment component includes a semiconductor module, an adapter, a first ventilation assembly, a second ventilation assembly and a third ventilation assembly. The first ventilation assembly includes a first fan and a first air duct. The second ventilation assembly includes a second fan and a second air duct. The third ventilation assembly includes a third fan and a third air duct. An upper end of the semiconductor module is located in the first air duct, and a lower end of the semiconductor module is located in the second air duct. The first air duct is in communication with the upper compartment, the second air duct is in communication with the outside, and the third air duct is in communication with the lower compartment. The first fan, the second fan and the third fan are all configured to provide power for air flowing. The step of controlling the temperature adjustment component to execute the refrigeration and heat dissipation mode specifically includes: controlling the adapter to provide power for the semiconductor module such that the upper end of the semiconductor module is in a refrigeration state, and the lower end of the semiconductor module is in a heat dissipation state; and controlling the first fan, the second fan and the third fan to be all in an operating state.

Alternatively, the step of controlling the temperature adjustment component to execute the refrigeration and heat dissipation mode further includes: determining whether the current temperature of the upper compartment is within a first high temperature gradient; when the current temperature is within the first high temperature gradient, controlling the adapter to provide power at a first voltage for the semiconductor module, and controlling the first fan to operate at a first rotating speed, the second fan to operate at a second rotating speed and the third fan to operate at a third rotating speed; and when the current temperature is not within the first high temperature gradient, controlling the adapter to provide power at a second voltage for the semiconductor module, and controlling the first fan to operate at a fourth rotating speed, the second fan to operate at a fifth rotating speed and the third fan to operate at a sixth rotating speed.

Alternatively, the temperature adjustment component further includes a standby battery. The standby battery is electrically connected to the adapter and the semiconductor module separately. The step of controlling the temperature adjustment component to execute the heating and temperature maintaining mode specifically includes: controlling the adapter to provide power for the standby battery; controlling the standby battery to provide power for the semiconductor module such that the upper end of the semiconductor module is in a heated state, and the lower end of the semiconductor module is in a refrigeration state; and controlling the first fan to be in an operating state.

Alternatively, the step of controlling the temperature adjustment component to execute the standard operating mode specifically includes: controlling the first fan and the third fan to be in an operating state.

Alternatively, the drone base station further includes a drone monitor. When a drone is parked on the parking apron, signal transmission is performed between the drone and the drone monitor. Before the step of acquiring a current temperature of the upper compartment, the mode adjustment method further includes: acquiring a monitor signal of the drone monitor and determining whether a drone is parked on the parking apron; when a drone is parked on the parking apron, performing the step of acquiring a current temperature of the upper compartment; and when no drone is parked on the parking apron, controlling the drone base station to be in a standby state.

A mode adjustment method for a drone base station in the embodiments of this disclosure includes: firstly, acquiring a current temperature of the upper compartment; subsequently, determining whether the current temperature is equal to or higher than a preset high temperature; when the current temperature is equal to or higher than the preset high temperature, controlling the temperature adjustment component to execute a refrigeration and heat dissipation mode; when the current temperature is lower than the preset high temperature, determining whether the current temperature is lower than or equal to a preset low temperature; when the current temperature is lower than or equal to the preset low temperature, controlling the temperature adjustment component to execute a heating and temperature maintaining mode; and when the current temperature is higher than the preset low temperature, controlling the temperature adjustment component to execute a standard operating mode. Through the above mode adjustment method, the drone base station can switch to corresponding preset operating modes in different operating environments, so as to ensure that the drone base station can provide a desirable charging environment for drones all the time, thereby improving the charging efficiency of the drones.

Figure 8:
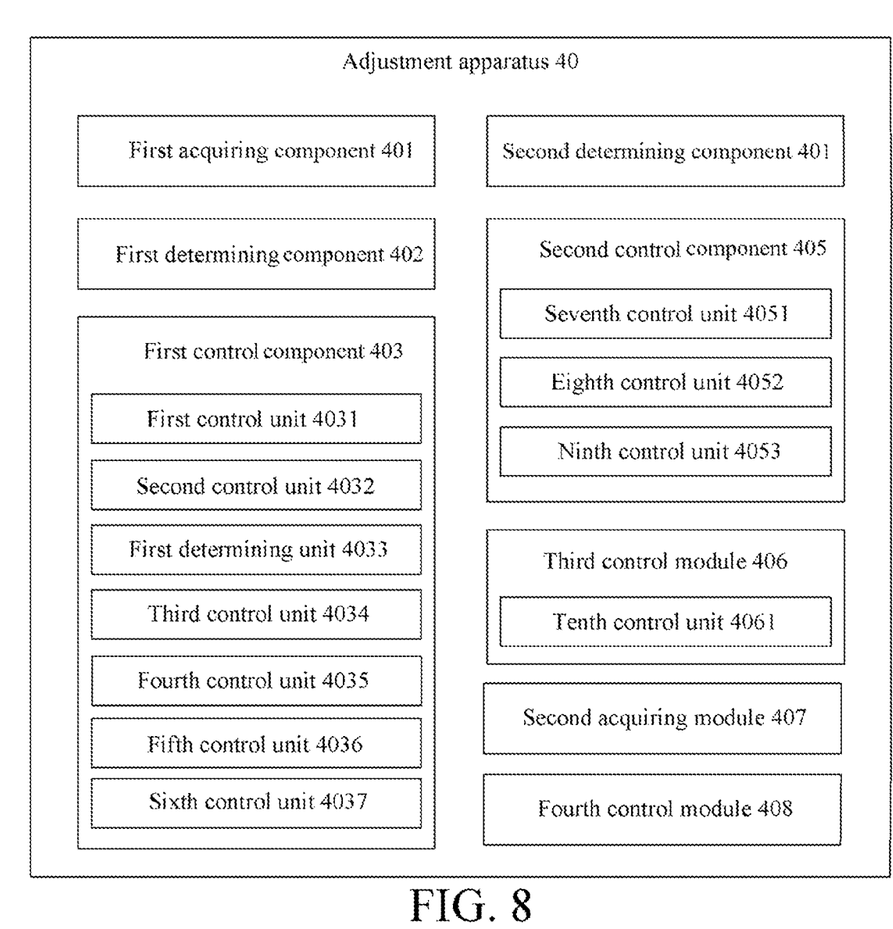
FIG. 8 is a functional block diagram of an adjustment apparatus according to an embodiment of this disclosure.

This disclosure further provides an adjustment apparatus 40 embodiment, and reference is made to FIG. 8. FIG. 8 is a functional block diagram of the adjustment apparatus 40 of this disclosure. The adjustment apparatus 40 includes a first acquiring component 401, a first determining component 402, a first control component 403, a second determining component 404, a second control component 405, and a third control component 406.

The first acquiring component 401 is configured to acquire a current temperature of the upper compartment. The first determining component 402 is configured to determine whether the current temperature is equal to or higher than a preset high temperature. The first control component 403 is configured to control a temperature adjustment component to execute a refrigeration and heat dissipation mode if the current temperature is equal to or higher than the preset high temperature. The second determining component 404 is configured to determine whether the current temperature is lower than or equal to a preset low temperature if the current temperature is lower than the preset high temperature. The second control component 405 is configured to control the temperature adjustment component to execute a heating and temperature maintaining mode if the current temperature is lower than or equal to the preset low temperature. The third control component 406 is configured to control the temperature adjustment component to execute a standard operating mode if the current temperature is higher than the preset low temperature.

In some embodiments, the first control component 403 includes a first control unit 4031 and a second control unit 4032.

The first control unit 4031 is configured to control the adapter to provide power for the semiconductor module such that an upper end of the semiconductor module is in a refrigeration state, and a lower end of the semiconductor module is in a heat dissipation state. The second control unit 4032 is configured to control the first fan, the second fan and the third fan to be all in an operating state.

In some embodiments, the first control component 403 further includes a first determining unit 4033, a third control unit 4034, a fourth control unit 4035, a fifth control unit 4036, and a sixth control unit 4037.

The first determining unit 4033 is configured to determine whether the current temperature of the upper compartment is within a first high temperature gradient. The third control unit 4034 is configured to control the adapter to provide power at a first voltage for the semiconductor module when the current temperature is within the first high temperature gradient. The fourth control unit 4035 is configured to control the first fan to operate at a first rotating speed, the second fan to operate at a second rotating speed and the third fan to operate at a third rotating speed. The fifth control unit 4036 is configured to control the adapter to provide power at a second voltage for the semiconductor module when the current temperature is not within the first high temperature gradient. The sixth control unit 4037 is configured to control the first fan to operate at a fourth rotating speed, the second fan to operate at a fifth rotating speed and the third fan to operate at a sixth rotating speed.

In some embodiments, the second control unit 405 includes a seventh control unit 4051, an eighth control unit 4052 and a ninth control unit 4053. The seventh control unit 4051 is configured to control the adapter to provide power for the standby battery. The eighth control unit 4052 is configured to control the standby battery to provide power for the semiconductor module, such that an upper end of the semiconductor module is in a heated state, and a lower end of the semiconductor module is in a refrigeration state. The ninth control unit 4053 is configured to control the first fan to be in an operating state.

In some embodiments, the third control component 406 includes a tenth control unit 4061. The tenth control unit 4061 is configured to control the first fan and the third fan to be in an operating state.

In some embodiments, the adjustment apparatus 40 further includes a second acquiring module 407 and a fourth control module 408. The second acquiring module 407 is configured to acquire a monitor signal of the drone monitor to determine whether a drone is parked on the parking apron, and to execute the step of acquiring a current temperature of the upper compartment when a drone is parked. The fourth control module 408 is configured to control the drone base station to be in a standby state if no drone is parked.

Alternatively, the first control component includes: a first control unit configured to control the adapter to provide power for the semiconductor module such that an upper end of the semiconductor module is in a refrigeration state, and a lower end of the semiconductor module is in a heat dissipation state; and a second control unit configured to control the first fan, the second fan and the third fan to be all in an operating state.

Figure 9:
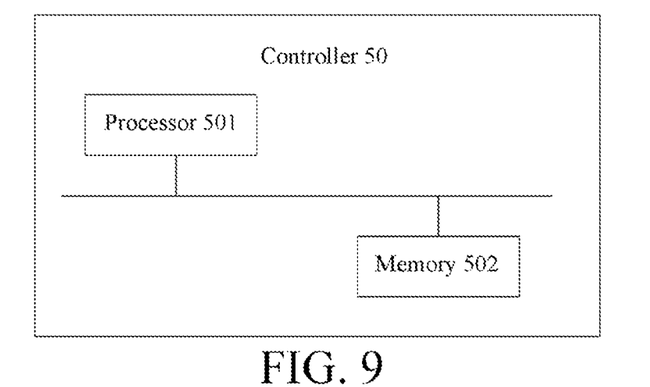
FIG. 9 is a schematic diagram of a controller of a drone base station according to an embodiment of this disclosure.

This disclosure further provides a drone base station embodiment, and reference is made of FIG. 9. FIG. 9 is a schematic diagram of a controller 50 of the drone base station according to the embodiment of this disclosure. The controller of the drone base station includes: at least one processor 501 and a memory 502 communicatively connected to the at least one processor 501. In FIG. 9, one processor 501 is used as an example. Instructions executable by the at least one processor 501 are stored in the memory 502. The instructions are executed by the at least one processor 501, so that the at least one processor 501 can perform the mode adjustment method for a drone base station as shown in FIG. 3 to FIG. 7 above, and implement the adjustment apparatus as shown in FIG. 8 above. The processor 501 and the memory 502 may be connected through a bus or in other manners. In FIG. 9, connection through a bus is used as an example.

As a non-volatile computer-readable storage medium, the memory 502 may be configured to store a non-volatile software program, and a non-volatile computer-executable program and module, for example, a program instruction/module corresponding to the mode adjustment method for a drone base station in the embodiments of this disclosure, such as each module shown in FIG. 8. By running the non-volatile software program, instructions, and module stored in the memory 502, the processor 501 executes various functional disclosures and data processing of a server, so as to implement the mode adjustment method for a drone base station in the above method embodiments.

The memory 502 may include a program storage region and a data storage region, where an operating system and an disclosure program required by at least one function may be stored in the program storage region, and data established according to use of the adjustment apparatus and the like may be stored in the data storage region. In addition, the memory 502 may include a high-speed random access memory, and may also include a non-volatile memory, for example, at least one disk storage device, a flash memory device, or other non-volatile solid-state storage devices. In some embodiments, the memory 502 optionally includes a memory that is remotely located relative to the processor 501, and the remote memory may be connected to the adjustment apparatus via a network. Examples of the above network include, but are not limited to, the Internet, an intranet, a local area network, a mobile communication network, and a combination thereof.

The one or more modules are stored in the memory 502. When the one or more modules are executed by the one or more processors 501, the mode adjustment method for a drone base station in any of the above method embodiments is performed. For example, the steps of the method as described above in FIG. 3 to FIG. 7 are performed, and the adjustment apparatus as shown in FIG. 8 is implemented.

The above product can perform the method provided in the embodiments of this disclosure, and has corresponding functional modules and beneficial effects for performing the method. For technical details that are not described in detail in the embodiments, reference is made to the method provided in the embodiments of this disclosure.

An embodiment of this disclosure further provides a non-volatile computer-readable storage medium. Computer-executable instructions are stored in the non-volatile computer-readable storage medium, and the computer-executable instructions are executed by one or more processors, for example, the steps of the mode adjustment method for a drone base station as shown in FIG. 3 to FIG. 7 are performed, and the adjustment apparatus as shown in FIG. 8 above is implemented.

An embodiment of this disclosure further provides a computer program product. The computer program product includes a computer program stored in a non-volatile computer-readable storage medium, and the computer program includes program instructions. When the program instructions are executed by a computer, the computer performs the mode adjustment method for a drone base station in any of the above method embodiments, for example, performing the steps of the method as shown in FIG. 3 to FIG. 7 and implementing the adjustment apparatus as shown in FIG. 8 above.

The above descriptions are merely embodiments of this disclosure, but are not intended to limit the patent scope of this disclosure. Any equivalent structural or process transformation made based on the content of the specification and accompanying drawings of this disclosure and any direct or indirect use of this disclosure in other related technical fields shall all fall within the patent protection scope of this disclosure in the same way.

What is claimed is:

1. A mode adjustment method for a drone base station, wherein the drone base station comprises a bracket, a parking apron and a temperature adjustment component; the bracket is provided with an accommodating chamber; the parking apron divides the accommodating chamber into an upper compartment and a lower compartment; the upper compartment is configured to park a drone; the temperature adjustment component is arranged in the lower compartment; the temperature adjustment component comprises a semiconductor module, an adapter, a first ventilation assembly, a second ventilation assembly and a third ventilation assembly; the first ventilation assembly comprises a first fan and a first air duct; the second ventilation assembly comprises a second fan and a second air duct; the third ventilation assembly comprises a third fan and a third air duct; an upper end of the semiconductor module is located in the first air duct; a lower end of the semiconductor module is located in the second air duct; the first air duct is in communication with the upper compartment; the second air duct is in communication with outside; the third air duct is in communication with the lower compartment; the first fan, the second fan and the third fan are all configured to provide power for air flowing; the temperature adjustment component has a refrigeration and heat dissipation mode, a heating and temperature maintaining mode and a standard operating mode; and the mode adjustment method comprises:

acquiring a current temperature of the upper compartment;
determining whether the current temperature is equal to or higher than a preset high temperature;
when the current temperature is equal to or higher than the preset high temperature, controlling the temperature adjustment component to execute the refrigeration and heat dissipation mode;
when the current temperature is lower than the preset high temperature, determining whether the current temperature is lower than or equal to a preset low temperature;
when the current temperature is lower than or equal to the preset low temperature, controlling the temperature adjustment component to execute the heating and temperature maintaining mode; and
when the current temperature is higher than the preset low temperature, controlling the temperature adjustment component to execute the standard operating mode;
wherein the step of controlling the temperature adjustment component to execute the refrigeration and heat dissipation mode specifically comprises:
controlling the adapter to provide power for the semiconductor module such that the upper end of the semiconductor module is in a refrigeration state, and the lower end of the semiconductor module is in a heat dissipation state; and
controlling the first fan, the second fan and the third fan to be all in an operating state.

2. The mode adjustment method according to claim 1, wherein the step of controlling the temperature adjustment component to execute the refrigeration and heat dissipation mode further comprises:
determining whether the current temperature of the upper compartment is within a first high temperature gradient;
when the current temperature is within the first high temperature gradient, controlling the adapter to provide power at a first voltage for the semiconductor module, and
controlling the first fan to operate at a first rotating speed, the second fan to operate at a second rotating speed and the third fan to operate at a third rotating speed; and
when the current temperature is not within the first high temperature gradient, controlling the adapter to provide power at a second voltage for the semiconductor module, and
controlling the first fan to operate at a fourth rotating speed, the second fan to operate at a fifth rotating speed and the third fan to operate at a sixth rotating speed.

3. The mode adjustment method according to claim 1, wherein the temperature adjustment component further comprises a standby battery; the standby battery is electrically connected to the adapter and the semiconductor module separately; and the step of controlling the temperature adjustment component to execute the heating and temperature maintaining mode specifically comprises:
controlling the adapter to provide power for the standby battery;
controlling the standby battery to provide power for the semiconductor module such that the upper end of the semiconductor module is in a heated state, and the lower end of the semiconductor module is in a refrigeration state; and
controlling the first fan to be in an operating state.

4. The mode adjustment method according to claim 1, wherein the step of controlling the temperature adjustment component to execute the standard operating mode specifically comprises:
controlling the first fan and the third fan to be in an operating state.

5. The mode adjustment method according to claim 1, wherein the drone base station further comprises a drone monitor; when the drone is parked on the parking apron, signal transmission is performed between the drone and the drone monitor; and before the step of acquiring the current temperature of the upper compartment, the mode adjustment method further comprises:
  acquiring a monitor signal of the drone monitor and determining whether the drone is parked on the parking apron;
  when the drone is parked on the parking apron, performing the step of acquiring the current temperature of the upper compartment; and
  when no drone is parked on the parking apron, controlling the drone base station to be in a standby state.

6. An adjustment apparatus, applied to a drone base station, wherein the drone base station comprises a bracket, a parking apron; the bracket is provided with an accommodating chamber; the parking apron divides the accommodating chamber into an upper compartment and a lower compartment; the upper compartment is configured to park a drone; wherein the adjustment apparatus comprises a temperature adjustment component which is arranged in the lower compartment; the temperature adjustment component has a refrigeration and heat dissipation mode, a heating and temperature maintaining mode and a standard operating mode;
  wherein the adjustment apparatus comprises:
    a first acquiring unit, configured to acquire a current temperature of the upper compartment;
    a first determining component, configured to determine whether the current temperature is equal to or higher than a preset high temperature;
    a first control component, configured to control the temperature adjustment component to execute the refrigeration and heat dissipation mode when the current temperature is equal to or higher than the preset high temperature;
    a second determining component, configured to determine whether the current temperature is lower than or equal to a preset low temperature when the current temperature is lower than the preset high temperature;
    a second control component, configured to control the temperature adjustment component to execute the heating and temperature maintaining mode when the current temperature is lower than or equal to the preset low temperature; and
    a third control component, configured to control the temperature adjustment component to execute the standard operating mode when the current temperature is higher than the preset low temperature;
  wherein the first control component comprises:
    a first control unit, configured to control the adapter to provide power for the semiconductor module such that an upper end of the semiconductor module is in a refrigeration state, and a lower end of the semiconductor module is in a heat dissipation state; and
    a second control unit, configured to control the first fan, the second fan and the third fan to be all in an operating state.

7. A drone base station, comprising:
  a bracket, a parking apron, a temperature adjustment component, a controller and a drone monitor, wherein the bracket is provided with an accommodating chamber; the parking apron divides the accommodating chamber into an upper compartment and a lower compartment; the upper compartment is configured for parking a drone; the temperature adjustment component is arranged in the lower compartment; the temperature adjustment component has a refrigeration and heat dissipation mode, a heating and temperature maintaining mode and a standard operating mode;
  the temperature adjustment component comprises a semiconductor module, an adapter, a standby battery, a first ventilation assembly, a second ventilation assembly and a third ventilation assembly, wherein the first ventilation assembly comprises a first fan and a first air duct, the second ventilation assembly comprises a second fan and a second air duct, and the third ventilation assembly comprises a third fan and a third air duct; the standby battery is electrically connected to the temperature adjustment component; the controller is in electrical connection and signal connection with the temperature adjustment component, the standby battery and the drone monitor separately;
  an upper end of the semiconductor module is located in the first air duct, a lower end of the semiconductor module is located in the second air duct, the first air duct is in communication with the upper compartment, the second air duct is in communication with the outside, the third air duct is in communication with the lower compartment, and the first fan, the second fan and the third fan are all configured to provide power for air flowing; and
  the controller comprises at least one processor; and a memory communicatively connected to the at least one processor, wherein instructions executable by the at least one processor are stored in the memory, and when the instructions are executed by the at least one processor, the at least one processor is configured to perform a mode adjustment method;
  wherein the mode adjustment method comprises:
    acquiring a current temperature of the upper compartment;
    determining whether the current temperature is equal to or higher than a preset high temperature;
    when the current temperature is equal to or higher than the preset high temperature, controlling the temperature adjustment component to execute the refrigeration and heat dissipation mode;
    when the current temperature is lower than the preset high temperature, determining whether the current temperature is lower than or equal to a preset low temperature;
    when the current temperature is lower than or equal to the preset low temperature, controlling the temperature adjustment component to execute the heating and temperature maintaining mode; and
    when the current temperature is higher than the preset low temperature, controlling the temperature adjustment component to execute the standard operating mode.

8. The drone base station according to claim 7, wherein controlling the temperature adjustment component to execute the refrigeration and heat dissipation mode specifically comprises:
  controlling the adapter to provide power for the semiconductor module such that the upper end of the semiconductor module is in a refrigeration state, and the lower end of the semiconductor module is in a heat dissipation state; and
  controlling the first fan, the second fan and the third fan to be all in an operating state.

9. The drone base station according to claim 8, wherein controlling the temperature adjustment component to execute the refrigeration and heat dissipation mode further comprises:

determining whether the current temperature of the upper compartment is within a first high temperature gradient;

when the current temperature is within the first high temperature gradient, controlling the adapter to provide power at a first voltage for the semiconductor module, and controlling the first fan to operate at a first rotating speed, the second fan to operate at a second rotating speed and the third fan to operate at a third rotating speed; and when the current temperature is not within the first high temperature gradient, controlling the adapter to provide power at a second voltage for the semiconductor module, and controlling the first fan to operate at a fourth rotating speed, the second fan to operate at a fifth rotating speed and the third fan to operate at a sixth rotating speed.

10. The drone base station according to claim 9, wherein the temperature adjustment component further comprises a standby battery; the standby battery is electrically connected to the adapter and the semiconductor module separately; and the step of controlling the temperature adjustment component to execute the heating and temperature maintaining mode specifically comprises:

controlling the adapter to provide power for the standby battery;

controlling the standby battery to provide power for the semiconductor module such that the upper end of the semiconductor module is in a heated state, and the lower end of the semiconductor module is in a refrigeration state; and controlling the first fan to be in an operating state.

11. The drone base station according to claim 10, wherein the step of controlling the temperature adjustment component to execute the standard operating mode specifically comprises:

controlling the first fan and the third fan to be in an operating state.

12. The drone base station according to claim 7, the mode adjustment method further comprises:

acquiring a monitor signal of the drone monitor and determining whether the drone is parked on the parking apron;

when the drone is parked on the parking apron, performing the step of acquiring the current temperature of the upper compartment; and when no drone is parked on the parking apron, controlling the drone base station to be in a standby state.

* * * * *